United States Patent [19]

Miller

[11] 4,117,068
[45] Sep. 26, 1978

[54] METHOD FOR FORMING CURVED PLASTIC FILM FROM A FLAT FILM

[75] Inventor: Charles Newell Miller, Richfield, Minn.

[73] Assignee: Control Data Corporation, Minneapolis, Minn.

[21] Appl. No.: 735,490

[22] Filed: Oct. 26, 1976

[51] Int. Cl.$^2$ ............................................. B29H 21/04
[52] U.S. Cl. ........................................ 264/130; 264/1; 264/292; 264/297; 264/316; 264/322
[58] Field of Search ................... 264/292, 322, 1, 292, 264/322, 320, 316, 130, 297

[56] References Cited

U.S. PATENT DOCUMENTS

| | | | |
|---|---|---|---|
| 2,166,215 | 7/1939 | Lloyd | 264/1 |
| 2,208,583 | 7/1940 | Hoof | 264/292 |
| 2,270,185 | 1/1942 | Dulmage | 264/292 |
| 2,332,674 | 10/1943 | Smith | 264/1 |
| 2,406,843 | 9/1946 | Luth | 264/292 X |
| 2,452,999 | 11/1948 | Daly | 264/292 X |
| 3,041,668 | 7/1962 | Bonza | 264/130 X |
| 3,414,395 | 12/1968 | Reese | 264/322 X |
| 3,496,143 | 2/1970 | Siggel | 264/292 X |
| 3,608,055 | 9/1971 | Long | 264/316 |
| 4,016,231 | 4/1977 | Hawkins | 264/322 X |
| 4,034,054 | 7/1977 | Sauer | 264/322 X |

*Primary Examiner*—Thomas P. Pavelko
*Attorney, Agent, or Firm*—Edward L. Schwarz

[57] ABSTRACT

A method for forming a flat, thin polyester film into a curved film using heat, peripheral support for the film, and a single die.

8 Claims, 2 Drawing Figures

METHOD FOR FORMING CURVED PLASTIC FILM FROM A FLAT FILM

BACKGROUND OF THE INVENTION

1. Field of the Invention

The invention is a method for molding thin flat polyester films into curved contours without producing wrinkles or other flaws during the process. The process tends to distribute stress across the sheets uniformly so as to leave surface coatings on them intact.

2. Description of the Prior Art

The standard method nowadays for molding thin flat plastic films into curved contours is by vacuum forming or drawing. However, while this technique is ideal for polycarbonate, wrinkles occur when forming polyester films is attempted.

The closest patent of which inventor is aware is U.S. Pat. No. 2,911,681, which discloses a method of forming small polyester films. Here, the die is inserted rapidly and is not preheated. The temperature of the film is quite high, at least 400° F being recommended. This elevated film temperature, if maintained for several minutes, experiment shows to cause yellowing of the film. U.S. Pat. No. 2,452,999 discloses slow die insertion, partially clamped edges and then total edge clamping during the final drawing. Both of these patents are directed to relatively deep drawing. Other related patents are U.S. Pat. Nos. 2,332,926; 3,007,206; 3,932,575; 2,977,637; 2,660,761; 2,937,403; 2,189,006; 2,666,951; 2,518,565; 3,947,539; 3,966,860, 3,273,203; 3,505,413; and 3,340,714.

BRIEF DESCRIPTION OF THE INVENTION

A flat polyester film is fastened to a frame larger than the area to be formed. The film is heated above a characteristic heat distortion temperature and maintained at this temperature. Then an all-convex mold or die preheated above the heat distortion temperature, and having essentially the final shape desired for the film, is slowly forced into the preheated sheet. The final position of the die is maintained while it and the film are cooled to below the heat distortion temperature. The die is then withdrawn leaving the film with substantially the shape of the die or possibly a slightly greater radius of curvature. A preferred method modifies the preceding by the use of a backing film held by the frame. The flat (workpiece) film to be formed is placed on the backing film and the die is forced into the surface of the workpiece film, causing both films to assume the desired contour.

Accordingly, one purpose of this invention is to form polyester plastic films into convex contours.

A second purpose of this invention is to avoid wrinkling of the workpiece films during forming.

Another purpose is to permit forming of a relatively expensive film to a desired contour with little or no waste of the expensive material.

Still another purpose is to permit creation of a desired contour in a transparent polyester film without affecting its optical qualities.

Still another purpose is to permit the formation of all-convex contours in polyester film without expensive or complex equipment.

DESCRIPTION OF THE PREFERRED PROCEDURES

Figure 1:
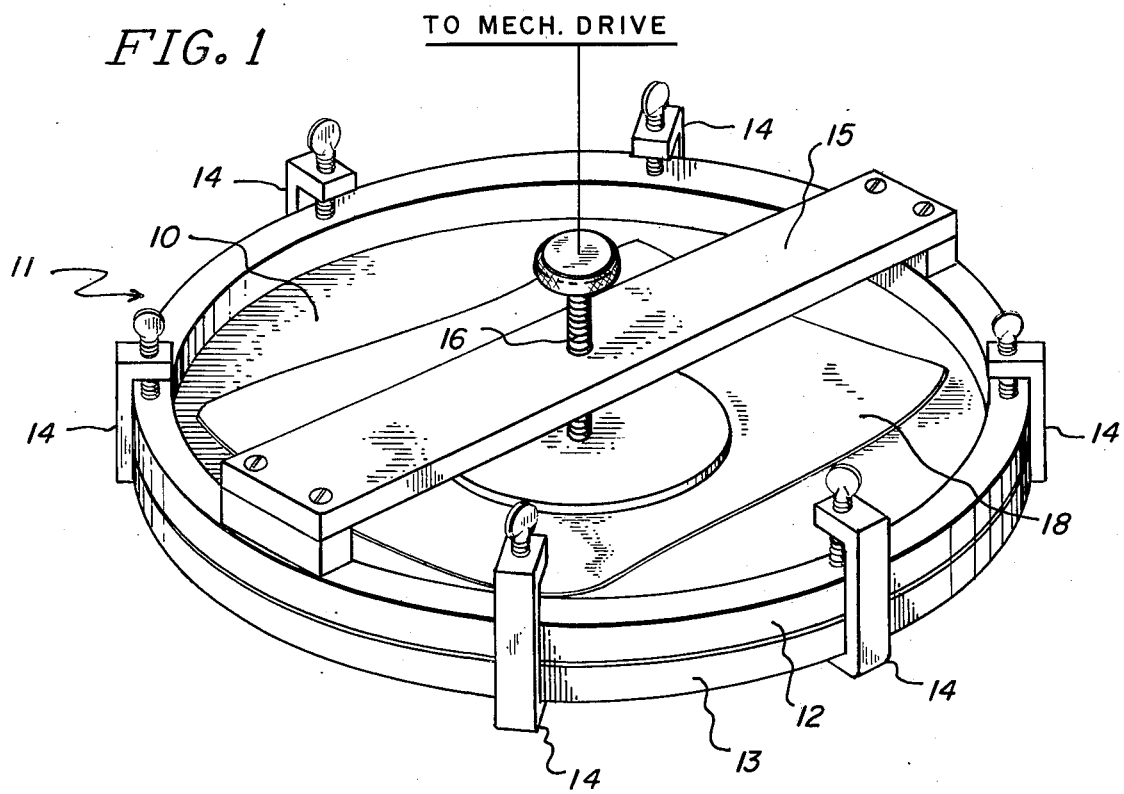
FIG. 1 is a perspective view of the film-contouring mechanism used in this invention with a film to be contoured clamped in place.
Figure 2:
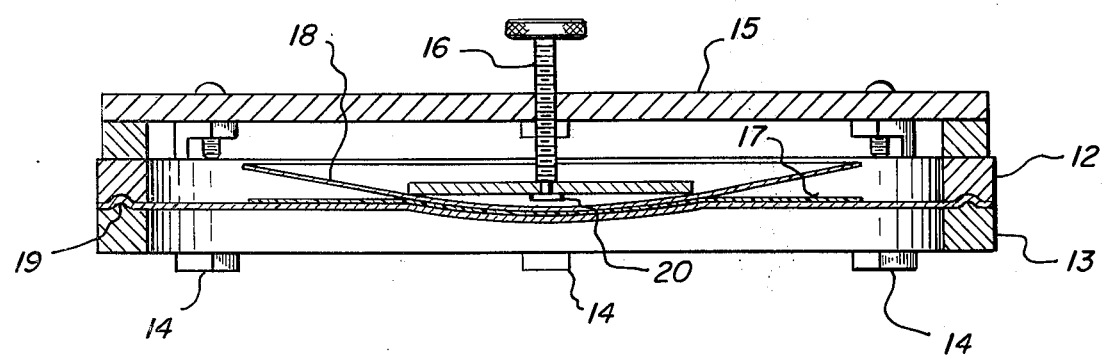
FIG. 2 is a cross-section view of the film-contouring mechanism with the workpiece and backing films in place.

Workpiece film 10 is a flat thin polyester film typically 0.001 to 0.010 in. thick. Frame 11 comprises an upper ring 12 and a lower ring 13 which mate along annular tongue and groove assembly 19 (FIG. 2). Beam 15 is fastened to upper ring 12 and contains a centrally located threaded hole into which jackscrew 16 meshes. Jackscrew 16 is attached by bearing 20 to die 18, and advances downwardly by rotating jackscrew 16. Bearing 20 keeps die 18 from turning with jackscrew 20. To mount sheet 10 in frame 11, upper ring 12 is lifted from lower ring 13 sufficiently to allow film 10 to be slipped between them, jackscrew 16 being backed sufficiently to lift die 18 above the lower edge of upper ring 12. Upper ring 12 is clamped to lower ring 13 with clamps 14, securing the edges of sheet 10 between rings 12 and 13. Parting powder or other heat-resistant lubricant is placed between sheet 10 and die 18.

To form film 10 into the contour of die 18, the entire mechanism is placed in an oven and the mechanism, die 18 and film 10 included, are raised to above the characteristic heat distortion temperature of the polyester material, at least 185° F. However, 300° F is the preferred operating temperature because of less chance of wrinkling of film 10 during the forming process. Temperature should not exceed 300° F by much, since discoloration of the film can occur above 300° F. After die 18 and film 10 temperature reach the operating temperature, a process found to take at least 20 minutes following insertion of the mechanism in an oven preheated to 300° F, jackscrew 16 is slowly turned to force die 18 into film 10. For a 0.003 in. polyester film 18 in. in diameter, and a die 18 having a radius of curvature of approximately 24 in. jackscrew 16 should be preferably advanced by 1 inch in 20 minutes. If jackscrew 16 is advanced too rapidly, wrinkling occurs. It is preferred that rotation be done by a flexible shaft connecting a motor located outside the oven to jackscrew 16. After die 18 has been forced into film 10 the desired depth, the entire mechanism is removed from the oven and allowed to cool. Jackscrew 16 is then reversed to withdraw die 18 from film 10 and clamps 14 are loosened to allow removal of film 10.

FIG. 2 is useful in describing a preferred procedure for this invention. Film 10 is inserted as previously described in frame 11. The workpiece to be formed into a curved contour, film 17, is covered with parting powder on each of its sides and is laid smoothly between die 18 and film 10. The heating and forming steps previously described are then performed. The advantage of this embodiment is that the film comprising the workpiece can be pre-cut to the desired shape thereby avoiding the difficulty of trimming a curved film. Backing film 10 can be a relatively inexpensive polyester film. Cost savings are also possible if workpiece film 17 is a more expensive film, perhaps as in an actual case having a conductive gold coating thereon, since waste of the more expensive film can be reduced.

Dust present on films 17 and 10 can cause small dimples therein after forming. Because of the rigidity of die 18 however, the dimples will always point away from die 18. Therefore, if film 10 or 17 is to be used in a device such as that described in the pending application entitled "Membrane-Type Touch Panel", U.S. Ser. No. 743,992, and filed Nov. 22, 1976, now U.S. Pat. No. 4,085,302 where clearance between a conductive surface and conductors on the curved film is important, film 17 should be placed with its conductive surface adjacent die 18. This causes dimples formed during the forming process to increase the clearance between the two surfaces wherever a dimple appears and thus prevent unwanted electrical contact between the membrane and the substrate adjacent to it. Use of clean room procedures can also eliminate these dust-caused dimples.

If clean room procedures are employed, or if the dimpling does not affect the use intended for the film, it is possible to form several films during a single operation by simply stacking them between film 10 and die 18. A longer period of time may be required to bring several layers of films to the operating temperature. Of course, parting powder must be placed between each pair of adjacent films to keep them from sticking together during the forming operation.

Whether one or more films are formed in a single step, experience teaches that the radii of curvature achieved will always be slightly more, say 1–10%, than that of the corresponding areas of die 18. This is probably because the workpiece film(s) are under tension at all times during forming. Reversing jackscrew 16 relieves the tension and causes the radii of curvature to increase. This factor must be compensated for when designing die 18.

The preceding describes the invention.

What is claimed is:

1. A method of shaping a flat polyester film comprising the workpiece into a predetermined convex contour, comprising:

(a) attaching a flat backing film larger than the film and made of substantially the same material, about its periphery to a frame within which the workpiece film can lie;
    (b) laying the workpiece film unclamped on the backing film;
    (c) heating the films to above their heat distortion temperature;
    (d) while the temperature is maintained, slowly forcing a die having substantially the predetermined contour into the films until the predetermined contour of the films are attained;
    (e) while maintaining the position of the die, cooling the films to substantially below the heat distortion temperature; and then
    (f) withdrawing the die from the films.

2. The method of claim 1, wherein the film supporting step comprises clamping the film about its periphery to a frame.

3. The method of claim 1, including the step of laying a plurality of workpiece films, unclamped, on the backing film in a position permitting the die to be forced against all of them simultaneously.

4. The method of claim 1 including the step of coating at least one of the die and a surface of the workpiece film with a heat-resistant lubricant prior to the heating of the films.

5. The method of claim 1, wherein the films heating step includes heating the films to about 300° F.

6. The method of claim 1, wherein die forcing step includes moving the die at a speed approximately 1 inch per 20 minutes.

7. The method of claim 1 wherein the die forcing step comprises employing a die having a contour with a slightly sharper curvature than the predetermined contour.

8. The method of claim 7, wherein the predetermined curvature is spherical, and the die forcing step includes employing a die having a radius of curvature 1–10% less than the desired radius of curvature.

* * * * *